United States Patent

[11] 3,590,748

| [72] | Inventor | Austin Richard Palmer<br>Longthorpe, England |
|---|---|---|
| [21] | Appl. No. | 721,394 |
| [22] | Filed | Apr. 15, 1968 |
| [45] | Patented | July 6, 1971 |
| [73] | Assignee | Baker Perkins Incorporated<br>Saginaw, Mich. |
| [32] | Priority | Apr. 18, 1967 |
| [33] | | Great Britain |
| [31] | | 17796/67 |

[54] MOULDING APPARATUS
5 Claims, 5 Drawing Figs.

[52] U.S. Cl............................................ 107/15,
107/8
[51] Int. Cl............................................ A21c 11/00
[50] Field of Search............................ 127/15.1,
15.5, 15.7, 15.9, 8.35; 18/2 RA, 21; 107/8, 10, 14

[56] References Cited
UNITED STATES PATENTS

| 2,155,952 | 4/1939 | Noxon et al. | 18/21 X |
|---|---|---|---|
| 3,134,138 | 5/1964 | Pufahl | 18/21 X |
| 1,742,774 | 1/1930 | Mairich | 107/15 (.1) |
| 3,048,922 | 8/1962 | Steinkemper et al. | 107/15 (.5) |

FOREIGN PATENTS

| 33,421 | 4/1928 | France | 107/8 .55 |

*Primary Examiner*—William F. O'Dea
*Assistant Examiner*—Robert I. Smith
*Attorney*—Learman, Learman and McCulloch ABSTRACT: Apparatus for moulding pie lids and bases comprises a rotary moulding drum with external moulding cavities from which moulded dough pieces are ejected by the application of compressed air internally of the drum, the ejection being assisted by a jet of compressed air directed along the surface of the drum by a fishtail nozzle, and a control system for synchronizing movements of receiving containers with movements of the drum to provide accurate dough depositing.

PATENTED JUL 6 1971

INVENTOR
AUSTIN R. PALMER

BY Learman, Learman
& McCulloch.

ATTORNEYS

INVENTOR
AUSTIN R. PALMER.
BY Gearman Learman & McCulloch,
ATTORNEYS

MOULDING APPARATUS

This invention relates to apparatus for moulding plastic material such as bakers dough into required shapes and for ejecting the shaped material from a moulding cavity into a tin or like container.

One object of the invention is to provide an apparatus as set out above, useful for shaping pie bases and depositing same into individual pie moulds of alternatively shaping pie lids for accurate positioning onto pie bases previously filled with fruit meat or other foods supported by individual pie moulds.

The invention consists in moulding apparatus for plastic material comprising a rotary drum having at least one moulding cavity in its surface, means for filling the cavity with material to be moulded, means for ejecting the material from the cavity, the filling and ejecting means being operable successively during rotation of the drum, and gas jet supply means forwardly of the drum axis in its direction of rotation for directing a gas stream along the drum surface to assist in ejecting the moulded material.

In one form of the invention as set out in the preceding paragraph the apparatus includes control means for containers moving on a travelling conveyor below the drum to synchronize the movement of containers on the conveyor with the rotational movement of the drum so that the moulded material will be deposited accurately into a container.

The invention will now be described by way of example with reference to the drawings in which.

Figure 1:
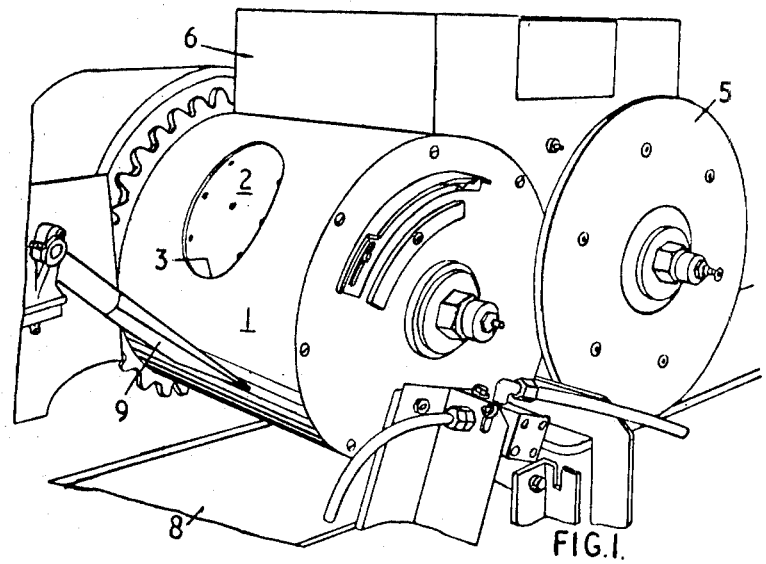
FIG. 1 is a perspective view from the front of pie-moulding apparatus.
Figure 2:
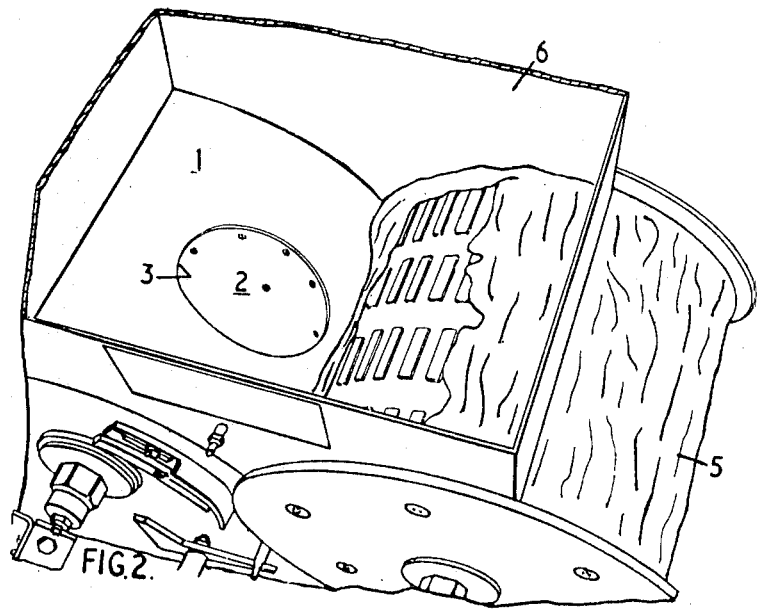
FIG. 2 is a perspective view of the apparatus from above.
Figure 3:
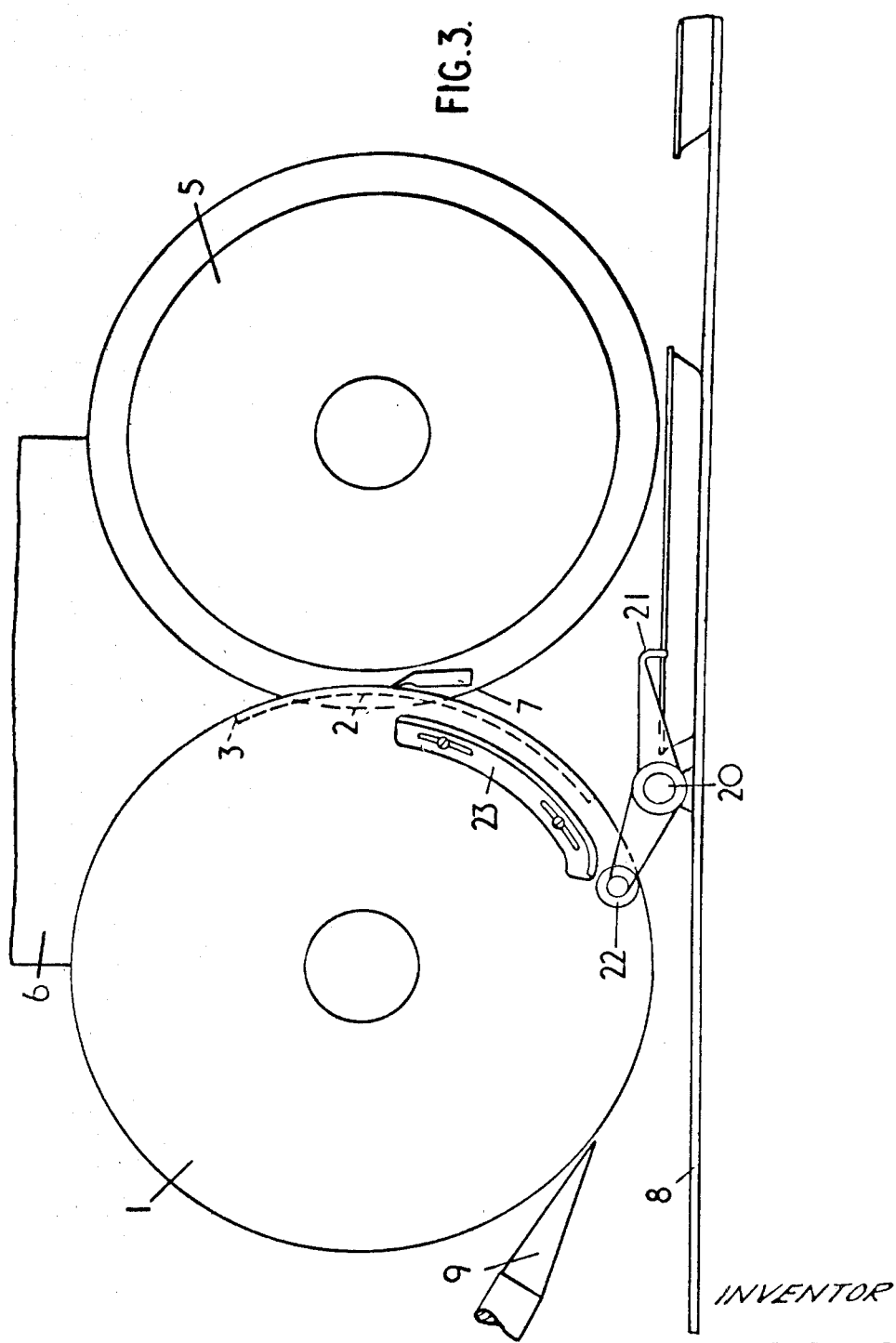
FIG. 3 is a diagrammatic side view of the apparatus.
Figure 4:
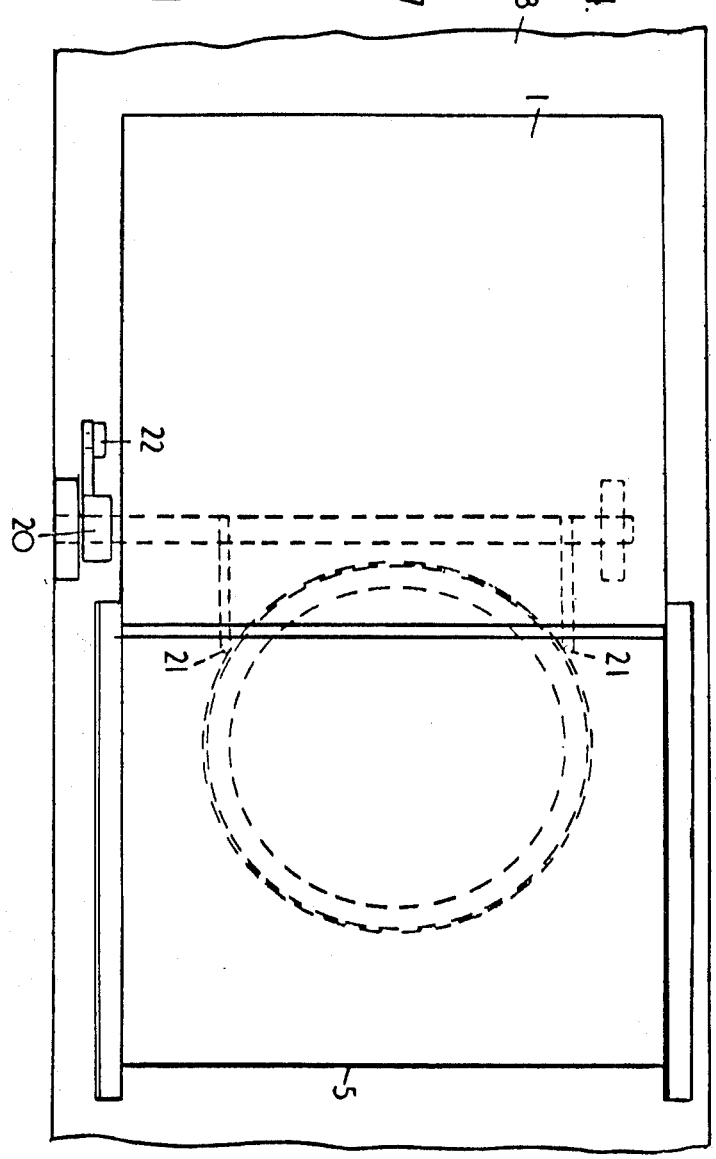
FIG. 4 is a diagrammatic plan view of the apparatus.

Referring to the drawings, a moulding drum 1 having a plurality of moulding cavities around its surface, each with a porous base 2 is adapted to rotate about a horizontal axis over a continuously travelling conveyor 8. The moulding drum cooperates with a ribbed rotary feed drum 5 so that during rotation of the drums the feed drum presses dough from a hopper 6 into the mould cavities and excess dough is removed from the moulding drum surface by a doctor blade 7. The moulding drum 1 has a hollow interior communicating with a valve-controlled supply of high-pressure air for ejecting moulded dough pieces from the die cavities as will be described, and to assist in releasing a dough moulding from its cavity an adjustable fishtail-shaped compressed-air nozzle 9 is mounted forwardly of the moulding drum so that the airstream issuing therefrom can be directed along the surface of the drum to assist in the ejection of a dough moulding from its cavity.

To synchronize movements of containers on conveyor 8 with rotational movement of the moulding drum to ensure accurate depositing of a dough piece into a container, a journally mounted shaft 20 carries a pair of container centralizing and arresting fingers 21 and a follower 22 adapted to be depressed by a cam 23 on the moulding drum to lift the fingers and allow a container to proceed under the drum. The spacing of the cam 23 and fingers 21 relative to the mould cavity is such that on passage of the container under the drum its leading edge will align with the leading edge of the mould cavity, the conveyor and drum being driven at like speeds.

Figure 5:
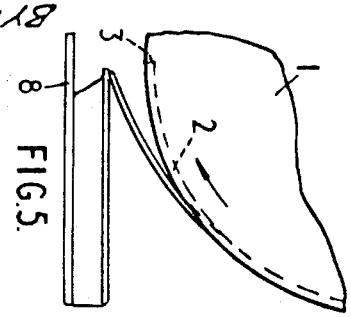
FIG. 5 is a side view of part of the apparatus showing the manner in which a moulded dough piece is deposited into a container.

When a mould cavity is in a depositing position, the compressed air system is operated, for example by a further cam on the moulding drum, to supply compressed-air interiorly of the drum and eject the moulded dough piece into the underlying container. The combined effect of the compressed air supplied interiorly of the drum, and the air supplied through nozzle 9, is that as the container and mould cavity move in synchronization the dough piece is ejected accurately into the container with a gradual peeling action as shown in FIG. 5.

Compressed air may be supplied continuously to the nozzle 9 or it may also be controlled in union with the supply of compressed air to the interior of the moulding drum.

While the referred drawings show containers in the form of individual tins or foils, a plurality of individual pie moulds for example incorporated in trays may be employed or containers fixedly attached to endless chain conveyors and suitable stops and timing means may be provided.

I claim:

1. Apparatus for molding dough material comprising a movable mold member having at least one molding cavity in its surface, means for filling the cavity with dough material to be molded, means for ejecting the material from the cavity, the filling and ejecting means being operable successively during movement of the movable mold member, container conveying means traveling beneath said movable mold member for conveying containers into a position beneath said mold member to receive the ejected, molded dough material, means for directing a gas stream between said conveyor means and said mold member surface to assist in moving the dough material from the cavity into a container beneath said mold member on said container-conveying means, and control means for synchronizing the movement of containers on the conveyor means with the movement of the mold member so that the ejected molded material will be deposited accurately into a container, said control means comprises container-arresting means and means for releasing the container-arresting means in timed relation with the movement of said movable member so that a container is adapted to pass under the mold member in alignment with a molding cavity.

2. Apparatus as set forth in claim 1 wherein the means for directing a gas stream comprises an adjustable fishtail-shaped nozzle.

3. Apparatus as set forth in claim 1 wherein the arresting means comprises pivoted container-arresting and centralizing fingers, and cam means responsive to movement of the mold member for operating the fingers to release a container for travel under the mold member in timed relation with a molding cavity.

4. Apparatus for molding dough material comprising: a movable mold member having at least one molding cavity in its surface; means for filling the cavity with material to be molded; means for ejecting the material from the cavity, the filling and ejecting means being operable successively during movement of said mold member; container-conveying means mounted below said mold member for conveying containers into position beneath said mold member to receive the ejected molded dough material; and control means for synchronizing the movement of containers on the conveying means with the movement of the mold member so that the ejected molded material will be deposited accurately into a container; said control means comprising container-arresting means and means for releasing the container arresting means in timed relation with the movement of the mold member so that each container passes under the mold member in alignment with a molding cavity.

5. Apparatus as set forth in claim 4 wherein the arresting means comprises pivoted container arresting and centralizing fingers, and cam means on the drum movable member for operating the fingers to release a container for travel beneath the drum in timed relation with a molding cavity.